Feb. 5, 1946.  F. BURCHELL ET AL  2,393,968
METHOD AND APPARATUS FOR PRODUCING COLORED DESIGNS
Filed May 29, 1940    5 Sheets-Sheet 1

INVENTOR
Iford Burchell And
Barbara Ivins
BY Brown & Jones
ATTORNEYS

Feb. 5, 1946.  F. BURCHELL ET AL  2,393,968
METHOD AND APPARATUS FOR PRODUCING COLORED DESIGNS
Filed May 29, 1940   5 Sheets-Sheet 2
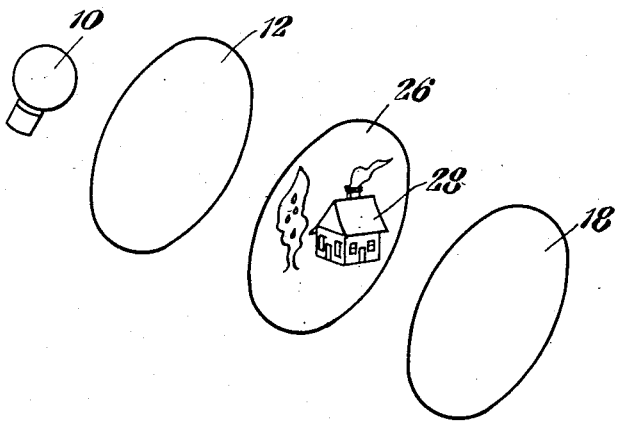
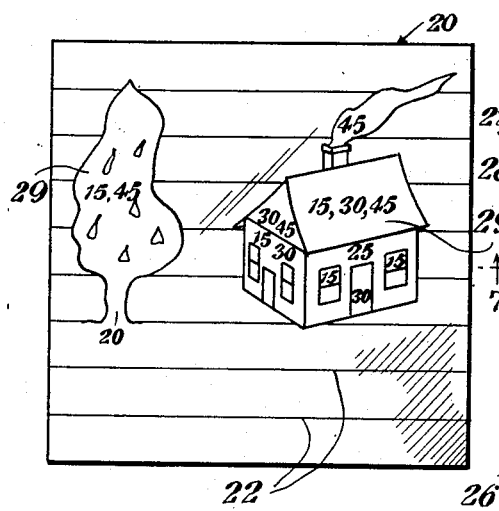
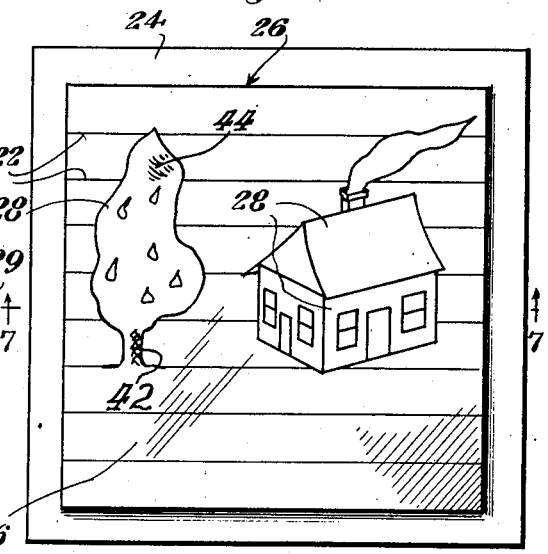
INVENTOR
Fford Burchell And
Barbara Ivins
BY Brown + Jones
ATTORNEYS Feb. 5, 1946. F. BURCHELL ET AL 2,393,968
METHOD AND APPARATUS FOR PRODUCING COLORED DESIGNS
Filed May 29, 1940 5 Sheets-Sheet 3

INVENTORS
Ford Burchell And
Barbara Ivins
BY Brown + Jones
ATTORNEYS

Feb. 5, 1946.   F. BURCHELL ET AL   2,393,968
METHOD AND APPARATUS FOR PRODUCING COLORED DESIGNS
Filed May 29, 1940   5 Sheets-Sheet 4

INVENTORS
Fford Burchell And
Barbara Irvin
BY
Kenyon & Kenyon
ATTORNEYS

Feb. 5, 1946.   F. BURCHELL ET AL   2,393,968
METHOD AND APPARATUS FOR PRODUCING COLORED DESIGNS
Filed May 29, 1940   5 Sheets-Sheet 5
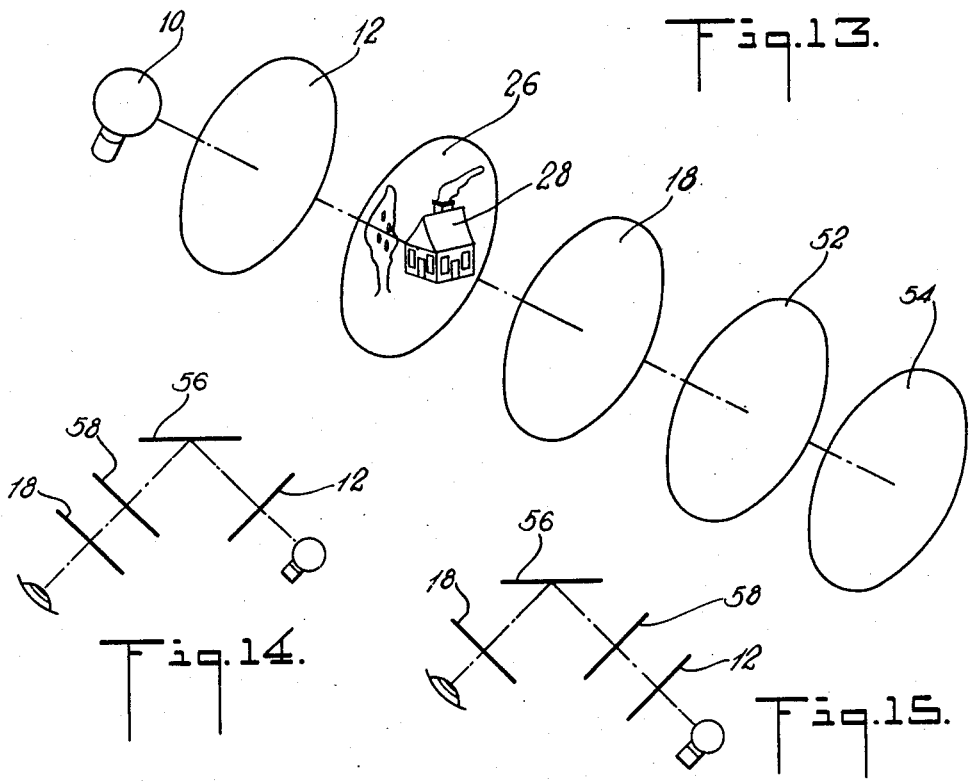
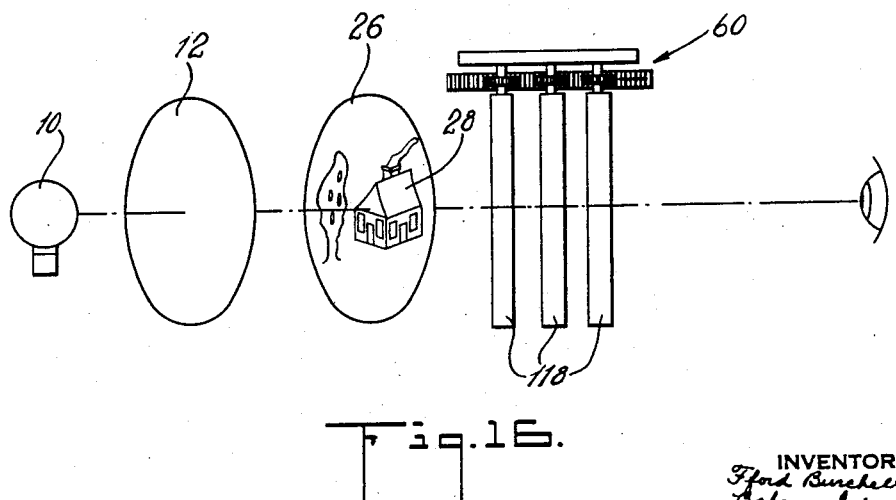

Patented Feb. 5, 1946

2,393,968

UNITED STATES PATENT OFFICE 2,393,968

METHOD AND APPARATUS FOR PRODUCING COLORED DESIGNS

Fford Burchell, Port Chester, and Barbara Ivins, New York, N. Y., assignors, by direct and mesne assignments, to Burchell-Holloway Corporation, New York, N. Y., a corporation of New York Application May 29, 1940, Serial No. 337,744

19 Claims. (Cl. 272—10)

This invention relates to a method of making colored designs and more specifically to translucent designs of changing colors, and to the devices producing the same.

In general, it is an object of the invention to provide a device of the character described, which will efficiently perform the purposes for which it is intended, which is simple and economical of construction, which can be expeditiously and conveniently manipulated, and which can be readily manufactured and assembled.

Another object of the invention is to provide a method of making a plurality of similar designs which, properly illuminated, show varying colors; to provide a method of building up a design of doubly refracting material to show at least a minimum color saturation when illuminated with light polarized successively in various directions and to show a succession of colors passing successively over laterally adjacent portions of the design and to show an apparent change in size, constant or fluctuating, increasing or decreasing, and to show an apparent relative displacement of the parts of the design; and to provide designs so produced.

Other objects of the invention will in part be obvious and will in part appear hereinafter.

The invention accordingly comprises the several steps and the relation of one or more of such steps with respect to each of the others, the apparatus embodying features of construction, combinations and arrangement of parts, adapted to effect such steps, and the article which possesses the characteristics, properties and relation of elements, all as exemplified in the detailed disclosure hereinafter set forth and the scope of the application of which will be indicated in the claims.

For a fuller understanding of the nature and objects of the invention, reference should be had to the following detailed description, taken in connection with the accompanying drawings, in which:

Fig. 4 is a diagrammatic representation of a device in which are used sheets which are made in accordance with the representation of Figs. 1-3, 5 and 6;

Fig. 5 is a view of an exemplary tracing the design of which may be copied in a sheet to be used in the device of Fig. 4;

Fig. 6 is a plan view of such a sheet on such a tracing on a support;

Figs. 11–16 are diagrammatic representations of devices which are modifications of the device represented in Fig. 4.

GENERAL THEORY

Figure 1:
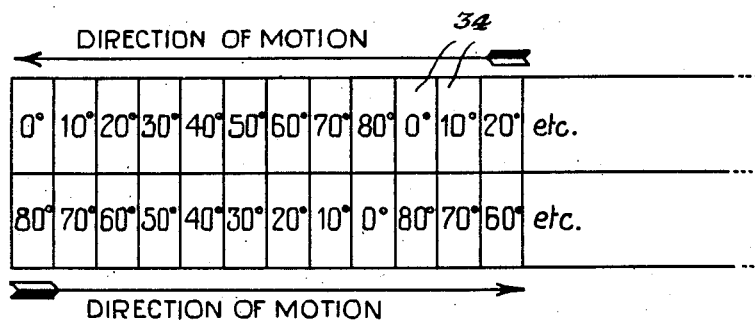
Fig. 1 is a diagrammatic representation of the arrangement of materials in a sheet such that under certain light conditions color appears to flow from one end to the other of the sheet.

When a thin birefringent crystal or a thin sheet of birefringent plastic material is placed between two sheets of polarizing material, at a suitable orientation with respect to the directions of polarization in the two polarizing sheets, it will appear to be colored. The reason for this is that when a beam of light falls on a sheet of birefringent material it is in general broken up into two plane-polarized beams, with their vibration planes at right angles to one another. These beams travel through the sheet at unequal rates. Because of their unequal rates a phase difference is introduced between the vibrations of the two beams as they pass through the crystal or plastic. The value of this phase difference for any given wavelength of light depends on (1) the difference of the two velocities, and (2) the length of the path through the sheet. Thus, a beam of light is plane-polarized when it passes through the first sheet of polarizing material; on entering the birefringent sheet the beam is broken into two components polarized at right angles to one another and, on emerging from the sheet and entering the second sheet of polarizing material, these two components are resolved into one plane-polarized beam again. But a phase difference has been introduced between the two parts of this same beam, and so the necessary conditions for interference are present. With a monochromatic light source, light will emerge from the device where there is a phase difference of $2\pi$ or any multiple thereof $(2n\pi)$, and dark where there is a difference of $\pi$ between the two components of the beam in the second polarizing sheet. However, with a white light source, brilliant colors emerge from the device. The phase difference introduced depends on the difference of the two velocities in the birefringent sheet. This difference varies for the different wave-lengths of the spectrum, and so the various wave-lengths will emerge with different phase differences. Thus, when one wave-length emerges with a phase difference of $\pi$ and is completely extinguished, another will emerge with a phase difference of $2\pi$ and will come through in full intensity, and so white light will be present with certain wavelengths eliminated from it, which is equivalent to saying that it is colored light.

A preferred machine consists of a source 10 of white light (an incandescent filament bulb); a revolving disc 12 of polarizing material, e. g., "Polaroid," called the polarizer; a design made by applying, in the desired shapes, pieces 28 of birefringent sheet (usually cellulose Scotch tape Cellophane) to an isotropic, or very slightly birefringent, sheet 26 (usually matte cellulose acetate); and a second "Polaroid" disc 18, called the analyzer, which is stationary. The revolving disc moves in either direction but, for purposes of description, will be considered hereinafter as moving in a clockwise direction as seen by one looking at the front of the machine. The side of the design on which the Cellophane 28 is applied faces the front of the machine. The birefringent material is placed to intercept a beam of light passing between the polarizer and the analyzer. It is thus interposed.

THE LAYING-OUT OF THE DESIGN

Figure 7:
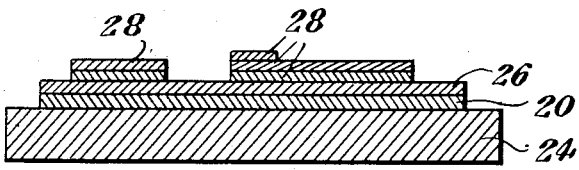
Fig. 7 is a view in cross section of the elements shown in Fig. 6.

The first step in the making of the design is an outline tracing 20 of the desired forms, lettering, etc., see Fig. 5. This tracing, on any suitable material such as any kind of paper, is ruled across with a series of indicia in the form of parallel lines 22, which are parallel to the direction of the axis of the analyzer in the machine. Unless otherwise stated, this axis and the ruled lines are taken to be horizontal. In making the actual design which goes in the machine, the tracing is fastened to a board 24 and a sheet 26 of cellulose acetate is pinned down on top of it see Figs. 6 and 7. The acetate sheet normally used is .010 inch thick, with a matte surface on one side and a glossy surface on the other. The Cellophane tape is applied to the glossy side which therefore faces up when the acetate sheet is fastened over the board. Each shape in the design is next covered with an appropriate number of layers 28 of tape, oriented in various ways with respect to the horizontally ruled lines.

When a beam of heterogeneously vibrating light, that is, ordinary light, such as the light from a match, electric light bulb or from the sun, is normally incident upon a point of a surface of a doubly refracting body, there arise in the body two beams, the direction of vibration in one being perpendicular to the direction of vibration in the other. Hereinafter, the term "significant direction," as applied to a surface of a doubly refracting material, shall refer to the projection onto said surface of the above-mentioned direction of vibration of the light in that one of the said two beams in which the light is propagated more rapidly than in the other. In commercial Cellophane, the directions of vibrations in the two rays in the Cellophane arising from a normally incident beam are substantially parallel and perpendicular to the edge of the mill roll of the Cellophane as originally produced. The tape is oriented by laying a protractor down on the tracing so that its flat side makes the desired angle with the horizontal lines, and laying down the edge of the tape along the edge of the protractor.

The tape is laid down so that it extends slightly beyond the shape to be covered. The outline of the shape is then traced with the point of the knife, cutting through the Cellophane tape but taking care not to cut through the acetate, and the excess tape around the shape is peeled off. This method assists in attaching a piece of tape which is exactly in registry with the area to be covered.

When two or three designs are to be made from the same tracing, or when a record is to be kept for making future duplicates, numbers 29 called indicia are written in each space of the tracing to indicate the number of layers and their orientation. Thus, 30, 30, 45, written into a space, would indicate that that space was to be covered with three layers of tape, the first two at thirty degrees and the third at forty-five degrees with the parallel lines 22, and the numbers 15, 45 would indicate two layers, the first at fifteen degrees and the second at forty-five degrees. Unless otherwise noted on the tracings, these angles are always taken to be in the first quadrant.

Figure 8:
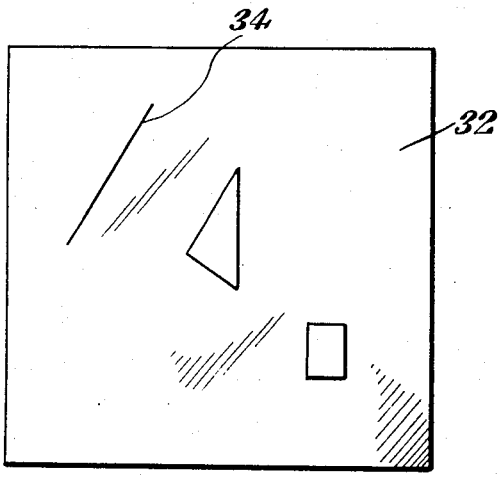
Fig. 8 is a view of one of a plurality of sheets used in duplicating the sheet shown in Figs. 6 and 7.

When a large quantity of the same design is to be made, a slightly different procedure is followed. The original tracing is numbered as before and from this numbered tracing 20 a sort of color separation is made, i. e., a separate tracing 32 (see Fig. 8) is made which outlines each shape having thirty degrees, e. g., for the orientation of its first layer of tape, and so on until all of the first layer is outlined. Similarly, a tracing is made for each piece having a given orientation in the second layer of tape, regardless of the angle of the first layer. The same is then done for the third layer. These tracings will serve, in the production line, the same purpose that was served by the tracing of the whole design where only one design was made, and their outlines will serve as a guide for the knife in cutting out the little pieces of Cellophane. A second series is then made of the same tracings, with the difference that instead of tracing the outline of each piece exactly, the outline is made one-sixteenth of an inch beyond the edge of the shape. Beside each shape a line 34 is ruled at the angle at which the tape is to be laid down. This second series of tracings are used in the making of stencils for the production line, the guide line being impressed into the stencil in order to serve the purpose that the protractor did before. For a method of making such designs with stencils see the Burchell Patent No. 2,293,696, issued August 25, 1942.

THE CONTROL OF COLOR SCHEMES AND THE BRILLIANCE OF COLORS

In order to obtain the best colors a special orientation of the tape or birefringent sheet may be used. There are two vibration directions for the light that passes through the sheet. In Cellophane one of these is parallel to the edge of the tape, and one perpendicular to it. In order to obtain the maximum color saturation, the birefringent sheet is so oriented with respect to the orientation of the analyzer with which it is used that the vibrations in the two beams emerging from the last layer of the sheet are of equal amplitude and at an angle of forty-five degrees to the direction of the analyzer. Or, more generally speaking, so that the component of one beam in the plane of vibration of the analyzer shall be equal in amplitude to the component of the other in the plane of vibration of the analyzer. For maximum intensity the first condition must be met, as the intensity falls off when the vibration direction of the sheet is moved to either side of forty-five degrees.

Consider the situation when the polarizer and analyzer are stationary and with the polarizing direction of one either parallel or crossed at right angles to the polarizing direction of the other. In order to meet the above condition, the birefringent sheet is put at such an angle that the vibration direction of each of the two beams makes an angle of forty-five degrees to the polarizing directions of analyzer and polarizer. As the orientation of the sheet is changed from this optimum position in either direction, an inequality will develop between the amplitudes of the two beams which will approach the point where only one beam is transmitted, as is the case when either vibration direction in the sheet is parallel or perpendicular to the polarizing direction of either the polarizer or the analyzer. At these points where only one beam is transmitted there is no color. There will also be no color at all if two Cellophane sheets are superposed and each placed at forty-five degrees to the analyzer but so that their edges are at right angles to one another or, more generally, when two birefringent sheets of equal thickness are so placed that what was the fast beam in one is all transmitted as the slow beam in the other so that there is no resultant path difference.

Since the thickness of the Cellophane coming from the mill is not absolutely uniform, color differences can be observed from one mill roll to the next, and also across the width of a mill roll, although an inch strip taken at a given distance from the edge of the mill roll will stay reasonably uniform throughout its length. If the tape is cut at random from various mill rolls, a considerable variation has been found to exist. Each roll may be compared with a series of color standards, made up of pieces of tape fastened to glass slides. It is then given a number to identify it with the standard which it matches. Six empirically chosen groups, identified by numbers from 1 to 6, have been found sufficient to identify the types of #600 Cellophane Scotch tape. In general, the higher the number of the tape, the nearer it is to the edge of the mill roll of Cellophane. In Table 1, below, are given the colors for one, two and three layers of three of these types of tape. The types not shown in the table are intermediate to those described. Three layers only are mentioned as more than this are seldom used in building up the designs. Looking over the table, however, it is possible to make a rough guess as to the colors obtainable with four and even five layers. For instance, number one tape, which gives yellow with a slight orange cast (when polarizer and analyzer are crossed) and gives blue (when polarizer and analyzer are parallel) with three layers, will give blue, of a paler tint (when polarizer and analyzer are crossed), and orange (when polarizer and analyzer are parallel) with four layers. It will also be noticed in the table that for the higher tape number (i. e., 4–6) there is a distinct effect of shading and the color is not the same at both edges. The color standards are made up from pieces of six-inch tape so that the shading noted is the average color observed over the six inches of tape.

TABLE 1

Colors of one, two and three layers of #600 Cellophane Scotch tape, with the polarizer and analyzer crossed, and with the polarizer and analyzer parallel, all of the Cellophane being at forty-five degrees.

*For crossed analyzer and polarizer*

Cellophane number one:
    One layer_____ White, tinged with a yellow orange
    Two layers____ Strong, medium blue
    Three layers__ Yellow with an orange cast Cellophane number three:
    One layer_____ Orange with a large admixture of white
    Two layers____ Light blue with a greenish cast
    Three layers__ Bright pink, without any yellow or blue cast Cellophane number five:
    One layer_____ Pinkish orange with some white
    Two layers____ Pale green shading to yellow
    Three layers__ Pinkish lavender shading through a darkish blue green to a brilliant emerald green

*For parallel polarizer and analyzer*

Cellophane number one:
    One layer_____ Dark indigo blue
    Two layers____ Brilliant yellow
    Three layers__ Medium blue Cellophane number three:
    One layer_____ Medium blue
    Two layers____ Orangey pink
    Three layers__ Light green Cellophane number five:
    One layer_____ Pale blue
    Two layers____ Red shading to lavender
    Three layers__ Yellow, shading to pink Number two and number four of #600 Cellophane Scotch tape show colors intermediate between those shown by number one and number three and number three and number five, respectively. Number six of the same tape shows colors which fit with the color succession shown by numbers one, three and five.

The situation becomes more complicated when the polarizer is rotated. For any number of layers of birefringent sheet, all at 45 degrees to the analyzer there will be only two colors, say a bright pink, when the polarizer and analyzer are crossed, and a bright green when they are parallel. As the polarizer rotates between these two positions, the pink becomes gray until at one point there is very little, if any, color visible (when the polarizer is at 45 degrees to the analyzer, and parallel to the direction of vibration of the sheet), then the green appears very faintly, increasing in saturation to a maximum when the polarizer and analyzer are again parallel, after which the green becomes increasingly gray until the polarizer is again at a 45 degree position, at which point there is again substantially no color. In order to get rid of these neutral points, the angle of the direction of vibration in the various layers must be varied in such a way that those directions are not all parallel. Then, when the direction of polarization of the polarizer is parallel to one of the vibration directions of the first layer so that this first layer is transmitting only one beam, there are two beams transmitted by the second layer and color is seen. For instance, suppose that the first layer of Cellophane tape is at 60 degrees, and the next two are at 45 degrees, and number three tape is being used. Then, with the polarizer crossed with the analyzer, three layers of tape are acting. The resultant color barely differs from the pink that is obtained with three layers at 45 degrees. When the polarizer is at 60 degrees to the analyzer, the layer of tape at 60 degrees transmits only one beam and only the two layers at 45 degrees are acting. These give the characteristic color of two layers, with the polarizer and analyzer crossed, though, with some admixture of white light, i. e., a light blue. When the polarizer and analyzer are parallel, there is again the three layer color, a bright green. At the next point where the first layer is neutralized, there is the orangey pink of two layers. In between these four points colors appear which lie between those mentioned but there is no point at which no color appears. Similarly, by placing the first two layers at 60 degrees and the third at 45 degrees there is obtainable a color change series which combines the range for one layer with that for three layers, instead of the ranges of two and three layers as above. In practice it has been found best to keep the last layer, which lies next to the analyzer in the machine, at an angle of 45 degrees. The other layers are varied through a range of 90 degrees. This arrangement does not always give the theoretical maximum of color saturation, but is a safe working rule.

As can be seen by considering the conditions for obtaining the maximum saturation, given above, it is imposible to obtain a maximum effect throughout a complete revolution of the polarizer with any given combination of layers. A certain amount of color can be maintained through the revolution, but there is always a definite fluctuation in the saturation. This fluctuation is compensated for in practice by assuring that any two adjacent areas shall not have their minima of saturation at the same time. This is done by varying the angles in the first layer of birefringent sheet.

The Illusion of Motion (a) *Motion of the color from one place to another*

Figure 2:
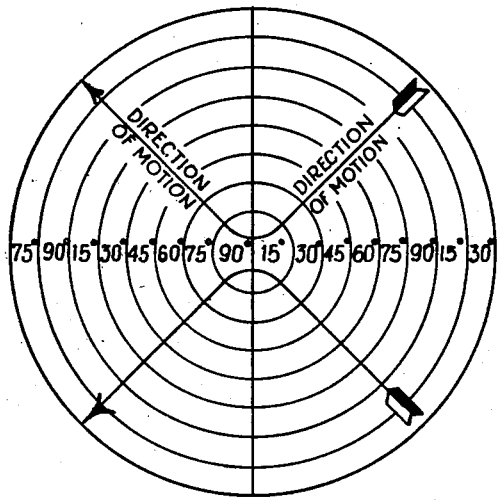
Fig. 2 is a similar representation of a sheet in connection with which color appears to flow radially.
Figure 3:
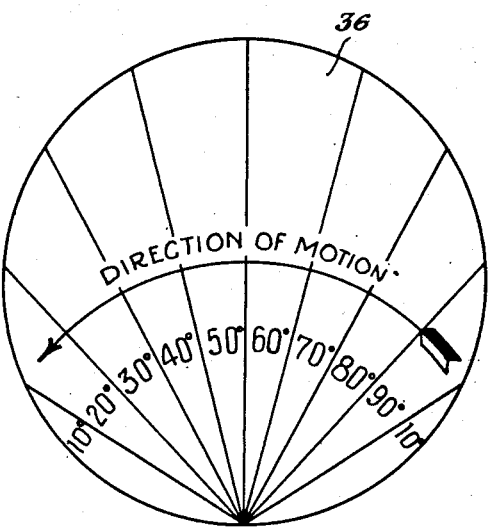
Fig. 3 is a similar representation of a sheet in connection with which color appears to flow around a point.

Colors can be made to appear to flow from one adjacent area to another by varying the orientation of successive pieces of the first layer of birefringent material in a regular manner. Where one layer of tape only is used, successive laterally adjacent bands of blue and pale whitish orange can be made to move along in any given direction. This is done by so arranging the successive pieces that their maxima of saturation appear one after the other. Suppose that it is desired to make the color flow from left to right across a horizontal band in a design. The band is divided into a series of vertical strips 34—see the diagrammatic representation in Fig. 1. The strip at the extreme left is covered with tape oriented, for example, at 80 degrees, the next is covered with tape at 70 degrees, and the next at 60 degrees, and so on until zero degrees is reached, at which point the series is started again. This causes the color to flow from left to right when the polarizer is rotating in the usual clockwise direction. If it is desired to have the color go from right to left, the tape on the extreme left hand strip is oriented, for example, at zero degrees, at 10 degrees on the next piece, and twenty on the next, and so on starting over again after 80 degrees. In other words, the color flows from the larger angle to the smaller. Radial motion to or from a point may be obtained in the same fashion by using tape annuli successively larger ones of which have their optical orientation successively varied, e. g., by successively greater angles from some predetermined direction, as is shown diagrammatically in Fig. 2. Therefore, if color is to flow in the clockwise direction around a point, a circle is divided into little strips 36—see Fig. 3, and, taking the strips in clockwise order, the tape is laid thereon in increasing angles.

A reversal in the rotation direction of the polarizer reverses the direction of the motion. The speed of the motion can be varied by varying one or more of the following factors, the R. P. M. of the polarizer, or the width of the strips, or the orientations of the tape. A five degree change shows less distinct differences in color between the individual strips than a fifteen degree difference but gives an apparent speed three times as great for a given width of strip. Widening the strips also makes the motion appear faster.

The color of the moving pieces may be varied by applying one or two more layers of tape. The angles of the second and third layers remain constant across the whole band, as the effect of motion appears to be decreased rather than helped by laying the second and third layers at successively changing angles. It is not advantageous to lay the second layer at 45 degrees as this decreases the effect of motion, which is improved as it differs from 45 degrees in either direction, although at a sacrifice in the brilliance of the color. The third layer may be laid at 45 degrees without ill effect.

The best effect is obtained when the successive laterally adjacent pieces are directly against each other, with an edge in common. The laterally adjacent pieces may, however, be spaced, but any area between them decreases the effectiveness of the illusion, although pieces of one and two layers, or two and three layers may be alternated effectively if the sequence in the first layer is uninterrupted.

It is usually the orientation of the first layer of tape which is changed. Given the first and the third layer at a constant orientation, the orientation of the second may be varied within very wide limits without causing any perceptible change in the color, and successive variations from one strip to the next yield almost no apparent motion. If the last layer is varied instead of the first, a fair degree of motion may still appear but the color range is not as satisfactory.

Tape of the same number should be used for all the strips or else a bumpy and uneven effect will appear, which may even stop the motion altogether.

An interesting variation of the effect of flowing color may be obtained by using the shaded tape (numbers 4–6) in which the color appears to flow back and forth as the polarizer is rotated. These tapes are referred to as shaded because the colors obtained from them are not the same all across the tape. They are obtained from the edges of the big rolls of Cellophane from which the other tapes are made. The variation in thickness and strain condition at the edges are the causes of the non-uniformity of color. Similar effects can be obtained by the use of any birefringent materials of unequal thickness, a wedge-shaped piece, for instance, giving an effect of moving fringes of color.

(b) *Apparent change in size of the areas of the design*

Figure 9:
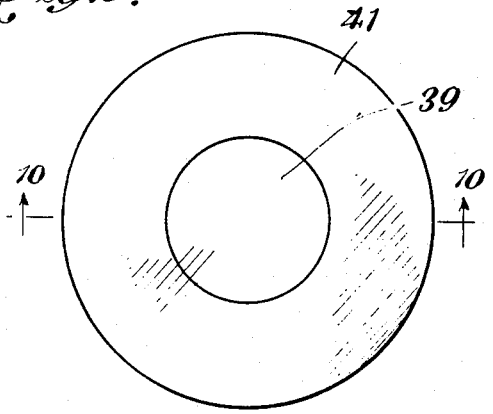
Fig. 9 is a view of a portion of a sheet having a part which, under certain light conditions, appears constantly to increase, or constantly to decrease, in size.
Figure 10:
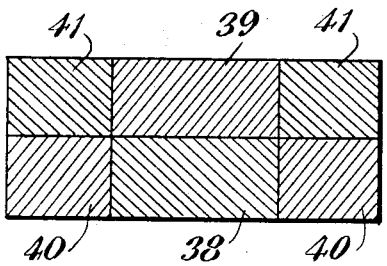
Fig. 10 is a cross section of the portion shown in Fig. 9.

If a band of moving color such as that described above is observed clearly, it will be seen that the edges of the strips themselves appear to move in the opposite direction to the flow of color. This effect may be used to give the appearance of continual change in the area of a strip or spot. Suppose a spot in the design entirely surrounded by another broken area. If the first layer 38 (see Figs. 9 and 10) of the spot is laid at 60 degrees and the first layer 40 of the larger area at 30 degrees and if they are covered by the same number of layers 39 and 41, the spot will appear to shrink continuously, and if the two orientations are exchanged the spot will appear to grow.

Rapidly alternated complementary colors also make areas appear to change in size. This is a pulsating effect rather than a steady appearance of growth or shrinkage. Thus, a one layer area, surrounded by an area with no tape on it, appears to pulsate as the polarizer revolves, and a spot covered with two layers of tape pulsates in an area covered with three, where the first layer is at the same orientation in the two.

The effects noted above are exceedingly advantageous in creating "animated" cartoons. Eyes can be made to blink, mouths to open and shut and, by judicious use of the pulsating effect, objects may even be made to jump up and down or from right to left, as when a narrow pulsating strip is left above the wing of a bird which will then appear to flap up and down.

THE EFFECT ON COLOR AND MOTION OF THE MATERIAL ON WHICH THE DESIGN IS MOUNTED

For most purposes the best underlying material, e. g., cellulose acetate in sheet form, is that which has the smallest birefrigence. The smaller the birefringence the more completely the effect of the acetate sheet can be disregarded, especially when it is oriented at 90 degrees—which is usually done.

There is, however, considerable variation in the acetate sheet made under various conditions and with different formulae. It has been found practical to divide it into two classes, (1) of negligible birefringence and (2) of fairly strong birefringence. Number two makes a considerable difference in the color ranges that may be obtained. Table two, below, gives a list of its effects on two types of tape. When the No. 2 acetate sheet is placed at an angle of 45 degrees to the axis of the analyzer it has a strong effect all its own. Instead of the white of the parallel position there is a noticeable brown tinge, and for the crossed position a bluish white. These two shades are almost equal in value, the brown being slightly darker than the bluish white. For this reason it is sometimes used in figure work where it is desired to have a background that will not pulsate, and a flesh tint that will vary as little as possible when the polarizer is rotated. Its main defect is that it spoils almost all motion of the flowing color type described above. Motion where only one layer of tape is used can still be obtained, but this gives a limited color range of brown and pale blue. As soon as another layer of tape is added in order to change the color range, there is the equivalent of trying to obtain motion by varying the angle of the second layer of tape, because where there are two or more layers of tape on a base of No. 2 acetate sheet, the orientation of the first layer can be varied considerably without changing the color.

Similar effects to those mentioned above will be obtained with any other transparent sheet on which designs are mounted and will depend on the degree of birefringence in the sheet, the difference in velocity between the two beams, and the thickness of the sheet.

THE USE OF PAINTS AND LACQUERS IN THE MAKING OF THE DESIGNS

When the design calls for a three-dimensional effect, shading may be used to model the forms. Black pyroxylin lacquer may be used for this purpose, applied to the back of the design. Such shading is shown at 42 in Fig. 6 on the trunk of the tree. It is visible through the sheet 26. It may be applied with an airbrush, and the technique is in general the same as that for any airbrush work. When the airbrushing is done at a desk it is preferably made considerably darker than appears necessary as the effect of viewing it against the light lessens the effect considerably. In general, some shading helps to give definition to a design and improves the color. The contrast provided by solid black areas and backgrounds is also useful to the designer.

Care must be taken, however, as the black shading often introduces a further complication into the motion of the design. For example, suppose an area covered with one layer of tape so that it changes from dark blue to nearly white is shaded from black at one edge to completely clear at the other, the shading will appear to move back and forth over the area, apparently stretching all the way to the clear edge when the area is blue, and retreating close to the black edge when the area is white. If this effect is superimposed on the types of motion described above, the appearance may be confused and the desired effect may be seriously impaired. This motion of the shading may, however, be used to good effect. A piston may be made to appear to move up and down in a cylinder by shading the area of the cylinder from black at the point farthest away from the piston to clear immediately next to the piston, or a fish may be made to appear to breathe by shading black around just inside its outline. Halos may be made to flash on and off in back of figures and lettering. And, by the proper arrangement of the shading, wheels and rods may even be made to turn. The effect is most pronounced wheer the shading goes from black to clear, rather than through shades of gray, and also where the Cellophane color goes from a very dark shade to a very light shade. A very strong effect is obtained where there is no Cellophane at all but only such dark purple and white as the polarizer and analyzer may give.

White lacquer is used as a de-polarizer. If a background is evenly painted with white, it remains an even value of gray as the polarizer turns. White may also be used to tone down the colors of the Cellophane. An interesting effect is obtained by shading figures, etc., with white. Such shading is indicated by the lines 44 in Fig. 6. Where no Cellophane is used, the shading appears alternately light against the dark background and dark against the light background. Where the areas are covered with Cellophane, the shading reverses itself in the same way where there is a very light and a very dark color and shows constantly dark where the colors keep the same value as they change.

Colored lacquer may be used where unusual shading effects are desired, and wherever a constant color is desired as in flesh tints, etc. The opaque colors are, in most instances, fairly good de-polarizers, when applied sufficiently thickly, but the transparent dye colors usually do not de-polarize. When a constant color is desired, either with a transparent color or in a pale tint of one of the heavier opaque colors, it should be backed up with white.

Where it is easier to work with a paint brush or a pen than with the air brush, as in small lettering and the drawing of faces, ordinary water colors or India ink can both be used.

It is also possible to obtain interesting effects by sticking transparencies of photographs and drawings to the sheet on which the design is mounted. Even whole photographs may be colored and animated by using a positive film as the sheet on which the birefringent sheet is mounted.

OTHER MATERIALS AND THEIR EFFECTS

(a) Crystals

If small crystals of any birefringent material are melted down and spread into a thin sheet and then allowed to re-crystallize, the thin layer of crystals that appears shows patterns of brilliant colors when placed between polarizer and analyzer. These patterns will depend on the shape of the crystals and, as above, on the different velocities of the two beams in each individual crystal, the orientation of the crystals, and their thickness. This effect may be used alone or in combination with any of the other effects described.

(b) Paper

Paper and some other materials may be substituted for white lacquer as de-polarizers.

(c) Cellophane

The Cellophane itself may be deformed, stretched, stamped or rolled out when wet to give a variety of effects. If the cellular structure is changed so as to re-orient the directions of vibration of the two beams, one group of effects is observed and, if the thickness alone is affected, another group is seen. These two groups of effects are in most cases to be superimposed.

EFFECT OF CHANGING THE LIGHT SOURCE

The most complete range of colors, for any given arrangement of polarizer, analyzer and birefringent material, is obtainable from a white light, such as sunlight. The light bulbs on the market do not transmit a complete white-light spectrum. Certain parts of the spectrum are lacking entirely and others somewhat low in intensity.

The white fluorescent tubes give, in general, the best range of colors. Blue fluorescents accent the blue colors and diminish the red and yellow. White incandescent bulbs give a good effect, though they give less brilliant blues than the white fluorescent tubes and decrease the effectiveness of yellow and yellow-green.

The effect is in all cases the same as that which would be obtained by the use of sunlight and filters, which suppressed the same parts of the spectrum as are lacking in the bulb in question.

OTHER TYPES OF MACHINES AND THE LAYOUT OF DESIGNS FOR THEM

A variation on the machine may be made by having the polarizer and analyzer fixed, in either the crossed or the parallel position, and rotating a thin sheet of birefringent material back of the design. The method of laying out the design remains the same, although the color ranges differ from those described above and the number of color changes for a given number of R. P. M. are double the number of those where the polarizer is rotated. Suppose that the polarizer and analyzer are crossed; when the rotating sheet has either of its vibration directions parallel to the polarizer, the same colors appear in the design as would be seen with polarizer and analyzer crossed, without the presence of the birefringent sheet. As the sheet swings around from these positions the colors are observed which would be seen by adding a layer of birefringent material to the design.

In one type of machine, the polarizer is stationary and the analyzer is a narrow piece of polarizing material 46 which swings back and forth like a pendulum. There the birefringent material is laid so that the first layer has its directions of vibration at 45 degrees to the direction of polarization of the polarizer. If the pendulum is fairly narrow, it will pass through only a very small angle as it goes past a small spot in the design so that the change in color will be negligible. The second and third layers of material are laid to give the maximum brilliance of color at this angle. Variations of this type of machine may be used where a limited color range is desired, as, for instance, if an area of color would go from red to green in the course of a complete revolution of the polarizer, this may be limited to a range of red to orange by moving the polarizer through only, say, fifteen degrees instead of the full three hundred and sixty degrees. Obviously it is immaterial whether it is the analyzer or polarizer which is a pendulum-like strip and in Fig. 11 it is the polarizer 46 which, for purposes of clarity, is so shown. It rotates about a point near its lower end.

In another type of machine (see Fig. 16), the polarizer is stationary and the analyzer is replaced by a series of strips 118 of polarizing material with the direction of polarization of each at forty-five degrees to the direction of the length of the strip. Each strip revolves on its own longitudinal axis. The rack and pinions 60 are shown merely to indicate the motion of the strips. Normally they are arranged so that in one position they are in a plane parallel with the plane of the sheet 26, i. e., normally the light passes through them simultaneously and not successively. The polarizer is placed so that it is in either the crossed or parallel position with these strips. As the strips revolve they will be alternately parallel and crossed with the polarizer. The birefringent material in these designs may be all laid with the directions of vibration at forty-five degrees to the polarizer.

In other machines where the polarizer and analyzer are at all times in either the crossed or parallel positions the birefringent material is laid with its vibration directions at forty-five degrees to the polarization direction of either the polarizer or analyzer.

THREE DIMENSIONAL ARRANGEMENTS OF BIREFRINGENT MATERIAL

Figure 11:
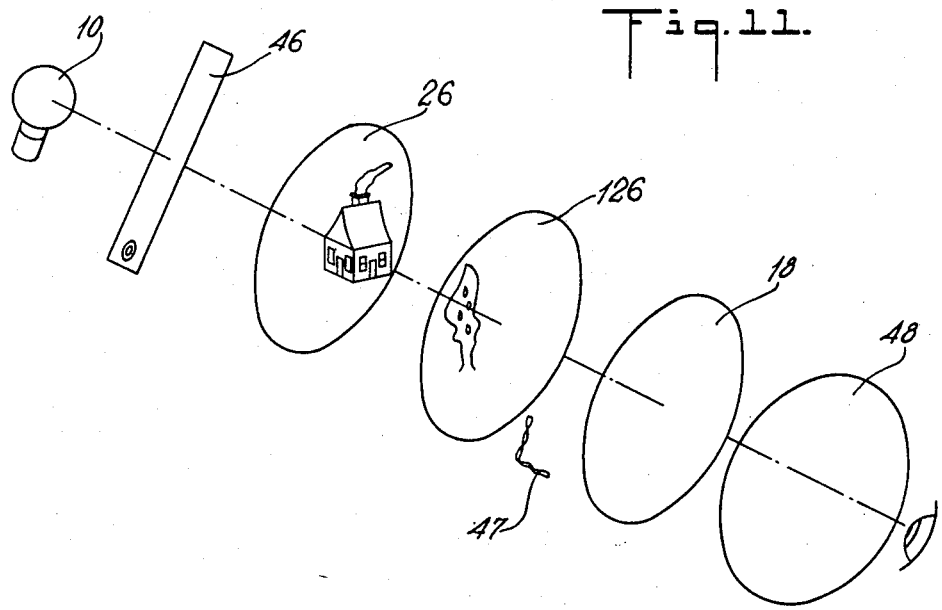

A three dimensional set-up may be made by placing sheets, 26 and 126 in Fig. 11, of clear acetate, glass, etc., one back of another, each sheet carrying a different part of the design. Or, the birefringent material itself may be twisted into various shapes as, for instance, when lettering is done by twisting narrow strips of birefringent tape into the forms of letters. The letter L is so shown at 47 in Fig. 11. The term "three-dimensional" herein refers to designs which are composed of a plurality of elements and presenting a plurality of outer surfaces toward an observer. This includes a twisted strip but does not include a single plane sheet.

DESIGNS MOVED ONE ACROSS THE OTHER

Changing colors may be obtained in an almost infinite variety of effects when the "design" is placed part on one sheet and part on another as shown at 26 and at 126 in Fig. 11, and the sheets moved with respect to one another, either rotated or with a linear motion. This may be done with the polarizer and analyzer stationary or in a combination with rotation of either of these, as where part of the design is affixed directly to the rotating polarizer.

THE USE OF MIRRORS

Where there is only a limited amount of space available for a color machine, the apparent area of the design may be increased by surrounding the front of the machine with mirrors placed at an angle to the design. The effect differs from that obtained with mirrors in connection with any other type of design in that the colors in the reflections will differ from those seen in the design itself, since the colors seen in the design vary with the angle from which the design is viewed. Such a mirror is shown at 48 in Fig. 11. The observer may look directly through the analyzer 18 or may view the image of the analyzer in the mirror 48.

Figure 12:
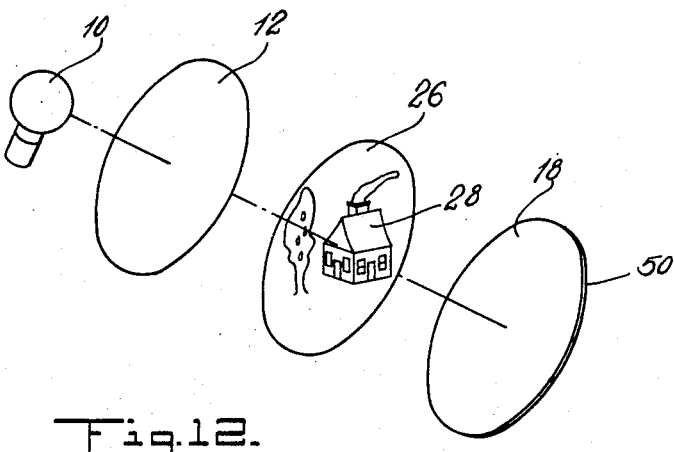

Some interesting effects may be obtained with mirrors which have been covered with a polarizing sheet. For instance, a machine may be constructed, leaving off the analyzers. Then, when the design is viewed directly it will have no color but when it is viewed in the polarized mirror it will appear colored. Such a mirror 50 covered with polarizing material 18 is shown in Fig. 12.

Light projected from any light source in front of which is a revolving sheet of polarizing material will make a mirror appear alternately dark and bright.

If, in front of the analyzer 18 of a color machine, one or more sheets of birefringent material 52 are placed, and in front of this another polarizing sheet 54, the colors in the design will be limited. See Fig. 13. Only the portion of the spectrum transmitted by the combination of the analyzer, the additional sheets of birefringent material, and the third sheet of polarizing material will be seen, the combination acting like a filter through which the machine is viewed.

When plane-polarized light is projected onto a non-depolarizing screen 56 (see Fig. 14), if the screen is viewed through a combination of polarizing material 18 and birefrigent material 58, the birefringent material being between the screen and the polarizing material, colors are seen in the birefringent material. See Fig. 14. Similarly, if some birefringent material 58 be placed between the source projecting polarized light and the screen 56, and the screen is then viewed through a sheet of polarizing material 18, colors are seen on the screen. (See Fig. 15.) The non-depolarizing screen 56 must consist of a metallic conducting surface. It may, for example, be aluminum paint.

TABLE 2

Effect of the more strongly birefringent sheets of cellulose acetate on the colors of #600 Cellophane. The polarizer and analyzer are either in the crossed or the parallel position, and the Cellophane and cellulose acetate sheet are at forty-five degrees. Two groups of colors are noted, one where the acetate sheet is "parallel" to the Cellophane, so that the path difference caused by the combination is increased, and one where the path difference is decreased, as compared with the path difference caused by the Cellophane alone. Only the effect of one layer of acetate sheet is considered.

*For crossed polarizer and analyzer*

Cellophane number one, the polarizing direction of the acetate sheet being parallel to the polarizing direction of the Cellophane:

One layer_____ Brownish orange
  Two layers_____ Pale green
  Three layers_____ Magneta pink Cellophane number one, acetate sheet crossed with respect to Cellophane:

One layer_____ Pale blue gray, the same color as shown by the acetate sheet alone
  Two layers_____ Brownish orange
  Three layers_____ Pale green Cellophane number five, acetate sheet parallel:

One layer_____ Brownish purple to indigo
  Two layers_____ Yellow orange to pink
  Three layers_____ Bright pale green to dirty yellow green Cellophane number five, acetate crossed:

One layer_____ Pale bluish gray, the same color as shown by the acetate sheet alone
  Two layers_____ Dark gray blue to pale greenish blue
  Three layers_____ Light pinkish orange to magenta and lavender

*For parallel polarizer and analyzer*

Cellophane number one, acetate sheet parallel:

One layer_____ Pale blue
  Two layers_____ Brick red
  Three layers_____ Bright yellow green Cellophane number one, acetate sheet crossed:

One layer_____ Pale brownish gray, same color as shown by the acetate sheet alone
  Two layers_____ Pale baby blue
  Three layers_____ Burnt orange Cellophane number five, acetate sheet parallel:

One layer_____ Pale beige, blue to yellow cast
  Two layers_____ Blue green to yellow green
  Three layers_____ Orange pink to lavender gray Cellophane number five, acetate sheet crossed:

One layer_____ Brown, stronger color with less white admixture than acetate alone
  Two layers_____ Pale whitish yellow to orange
  Three layers_____ Green to pale yellow green Since certain changes may be made in carrying out the above process and in the product, and modifications effected in the apparatus for practicing the principle thereof, without departing from the scope of the invention, it is intended that all matter contained in the above description or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In a method of laying out a design, the combination of steps comprising forming a design on a sheet of material, designating a predetermined direction on said sheet by an indicium, associating indicia with certain elements of said design indicating the number and orientation of layers of material to be applied to said elements and associating other indicia with other elements of said design indicating the number and orientation of layers of material to be applied to said other elements.

2. In a method of laying out a design, the combination of steps comprising forming on a sheet of material certain elements of an entire design which is to be built up, on another sheet, by superimposing laminations which have the contours of elements of said design, limiting said certain elements to those upon which, on said other sheet, the elements of the lowermost lamination are to have a common property, forming on a third sheet certain other elements of said entire design, and limiting said certain other elements to those upon which, on said other sheet, the elements of the lowermost lamination are to have another common property.

3. In a method of laying out a design, the combination of steps comprising forming on a sheet of material certain elements of an entire design which is to be built up, on another sheet, by superimposing laminations which have the contours of elements of said design, limiting said certain elements to those upon which, on said other sheet, the elements of the lowermost lamination are to have a common property, forming on a third sheet certain other elements of said entire design, limiting said certain other elements to those upon which, on said other sheet, the elements of the lowermost lamination are to have another common property, forming on a fourth sheet certain elements of said entire design, and limiting the last-mentioned elements to those upon which, on said other sheet, the elements of an upper lamination are to have a common property.

4. In a method of laying out a design, the combination of steps comprising forming on a sheet of material certain elements of an entire design which is to be built up, on another sheet, by superimposing laminations which have the contours of elements of said design, limiting said certain elements to those upon which, on said other sheet, the elements of the lowermost lamination are to have a common property, forming on a third sheet certain other elements of said entire design, limiting said certain other elements to those upon which, on said other sheet, the elements of the lowermost lamination are to have another common property, forming, with slightly enlarged dimensions, on a fourth sheet certain elements of said entire design, and limiting the last-mentioned elements to those upon which, on said other sheet, the elements of an upper lamination are to have a common property.

5. In a method of laying out a design, the combination of steps comprising forming on a sheet of material certain elements of an entire design which is to be built up, on another sheet, by superimposing oriented laminations which have contours of elements of said design, limiting said certain elements to those upon which, on said other sheet, the elements of the lowermost lamination are to have a common orientation, forming on a third sheet certain other elements of said entire design, and limiting said certain other elements to those upon which, on said other sheet, the elements of the lowermost lamination are to have another common orientation.

6. In a method of presenting a colored design the colors of which change cyclically with the passage of time and pass through a limited variation of color saturation, the combination of steps comprising establishing a beam of plane-polarized light the direction of vibration of which varies with the passage of time, intercepting said beam with a sheet of polarizing material adapted for transmitting only light having a predetermined direction of vibration and intercepting said beam, before it reaches said sheet, with two superimposed layers of birefringent material, the significant direction of each of said layers being at a definite angle to said predetermined direction and at a definite angle to the significant direction of the other of said layers which latter angle may be varied up to 45° whereby the color saturation of light emerging from said sheet shall not be below a predetermined minimum.

7. In a method of preparing an optical element adapted for use with two sheets of polarizing material, which sheets transmit only light having a predetermined direction of vibration, in the presenting of a colored design, the colors of which change cyclically with the rotation of one of said sheets through a limited variation of color saturation, the step comprising superimposing two layers of birefringent material with the significant direction of each layer at a definite angle to the direction of orientation of one of said sheets and at a definite angle to the significant direction of the other of said layers which latter angle may range up to 45° whereby the color saturation of light emerging from said design shall not be below a predetermined minimum.

8. In a method of presenting a colored design the colors of one portion of which change cyclically with the passage of time and wherein the color saturation shall not be below a predetermine minimum, and the colors of another portion of which change cyclically with the passage of time and wherein the color saturation of the latter portion shall not be below a predetermined minimum which occurs at a different time from said first named predetermined minimum, the combination of steps comprising orienting a sheet of polarizing material so that the vibrations of light transmitted by it are in a predetermined direction, superimposing two layers of birefringent material, passing plane-polarized light through said layers and sheet and successively varying the direction of vibration of said light, placing the significant direction of each of said layers at an angle to the significant direction of the other layer and at an agle to said predetermined direction, and making the first-mentioned angle as great as possible within a predetermined range of angles which range gives a predetermined color, whereby the light emergent from said sheet has a certain predetermined minimum color saturation at all times, and similarly positioning two other birefringent layers laterally adjacent and with their significant directions at definite angles with the significant directions of the two first-mentioned layers whereby the adjacent areas of the pairs of laminations do not have their minimum color saturations simultaneously.

9. A design adapted to be used with a sheet of polarizing material positioned with respect to a source of light so that the vibrations of light transmitted by the sheet are in a predetermined direction, comprising layers of birefringent material the significant direction of each of which is at an angle to the significant direction of the other and at an angle to said predetermined direction, whereby the light emerging from said sheet and layers has a certain minimum color saturation at all times, other birefringent layers laterally adjacent with, and with their significant directions at definite angles with, the significant directions of the first mentioned layers, whereby the adjacent areas of the layers of laminations do not have their minimum color saturation simultaneously when plane-polarized light is passed through said layers and sheet and the direction of vibration of said light is successively varied by other polarizing material.

10. A method of preparing an optical element including a design for causing a portion of the design constantly to appear to change size comprising forming a portion of the design with doubly refracting sheet material having its significant direction in a predetermined direction, and forming another portion of the design about a substantial part of the periphery of the first portion and of doubly refracting material having its significant direction at an angle with said predetermined direction, whereby when the design is interposed between two light-polarizing sheets with a source of white light behind the sheets, and the angle is varied between said predetermined direction and the direction of polarization of one of said two light-polarizing sheets, said appearance of change of size occurs for an observer positioned to receive light from said source that has passed through the polarizing sheets and design.

11. An optical element including a design, a part of said design being adapted to appear to change size in use, said part comprising a portion of the design made of doubly refracting sheet material having its significant direction in a predetermined direction, and another portion of the design arranged about a substantial part of the periphery of the first portion and of doubly refracting material having its significant direction at an angle with said predetermined direction, whereby when the design is interposed between two light-polarizing sheets with a source of white light behind the sheets, and one of the polarizing sheets is maintained with its polarization direction at another angle with the predetermined direction and the other of the polarizing sheets is moved so that its polarizing direction is at successively different angles with the predetermined direction, and the angle is varied between said predetermined direction and the direction of polarization of one of said two light-polarizing sheets, said part of said design appears constantly to change size to an observer positioned to receive light from said source that has passed through the polarizing sheets and the design.

12. A method of preparing an optical element for causing an unreal apparent motion in a colored design comprising forming a portion of a design with superposed layers of doubly refracting material, with the significant axes of the respective layers at definite angles with respect to each other forming another portion of the design of translucent material, and applying shading to said other portion with the heaviest shading distal to the first-named portion, whereby when said design is interposed between two light-polarizing means, and light is passed through said design and said polarizing means, and the orientation of said design is varied with respect to one of said means, said unreal apparent motion is visible to an observer positioned to receive light that passes through both said polarizing means and the said portions of said design.

13. A method of preparing an optical element for causing an unreal apparent motion in a colored design comprising forming a portion of a design with superposed layers of doubly refracting material, with the significant axes of the respective layers at definite angles with respect to each other and applying a de-polarizing agent, which is a predetermined color in reflected light, to portions of the design.

14. A method for presenting a colored design comprising placing a design of variously oriented areas of birefringent material either in front or back of a second design of variously oriented areas of birefringent material, each of said areas having superposed layers of said birefringent material with the significant axes of said layers at definite angles with respect to each other, passing a beam of polarized light successively through said designs, and moving one of said designs in the plane of said one design.

15. A method of presenting a colored design, comprising passing light through a polarizing element, illuminating with light from said element birefringent material, which has the shape of a three-dimensional design element, and in which portions of said design element have superposed layers of said birefringent material with the significant axes of said layers at predetermined definite angles with respect to each other and viewing said light through an analyzing element and rotating one of said last-mentioned elements.

16. In a method of the character described, the combination of steps comprising orienting a sheet of polarizing material so that the vibrations of light transmitted by it are in a predetermined direction, superimposing two layers of birefringent material, passing plane-polarized light through said layers and sheet and successively varying the direction of vibration of said light, placing the significant direction of each of said layers at a definite angle to the significant direction of the other layer and at a definite angle to said predetermined direction, whereby the light emergent from said sheet has a certain minimum color saturation at all times, and viewing said layers through an analyzer and through the analyzer and in a mirror.

17. In a method of laying out a design, the combination of steps comprising forming on a sheet of material certain elements of an entire design which is to be built up, on another sheet, by superimposing laminations which have contours of elements of said design and which are oriented with respect to a predetermined optical property, limiting said certain elements to those on which, on said other sheet, the elements of the lowermost lamination are to have a common orientation of said optical property, forming on a third sheet certain other elements of said entire design, and limiting said certain other elements to those upon which, on said other sheet, the elements of the lowermost laminations are to have another common orientation of said optical property.

18. In combination a light source, light-polarizing means, doubly refracting means arranged in a design, light analyzing means adapted for presenting either of two faces toward said refracting means, said polarizing, refracting and analyzing means being positioned to transmit, in the order named, light from said source.

19. An optical element for use with a pair of polarizers which respectively transmit only light having a predetermined direction of vibration in the presenting of a colored design, the colors of which change cyclically with the movement of at least one of the polarizers through a limited variation of color saturation, comprising two superimposed layers of birefringent material with the significant direction of each layer at a definite angle to the direction of orientation of one of said polarizers and at a definite angle to the significant direction of the other of said layers, said latter angle ranging up to 45° whereby when said design is utilized with the polarizers the color saturation of light emerging from said design will not be below a predetermined minimum.

FFORD BURCHELL.
BARBARA IVINS.